June 14, 1960  C. R. FAGIANO  2,940,568
ONE-WAY CLUTCH AND DRAG SPRING
Filed March 25, 1957
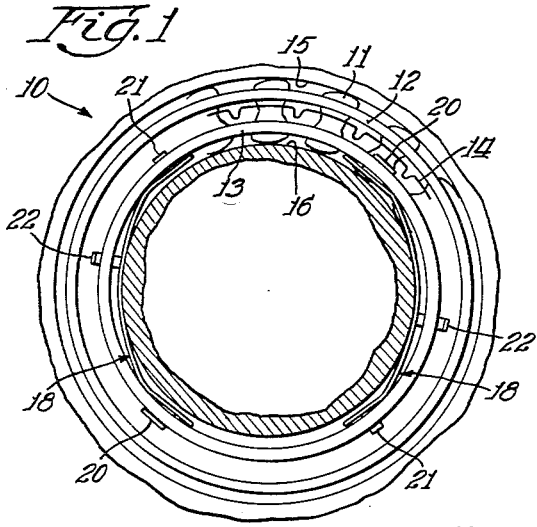
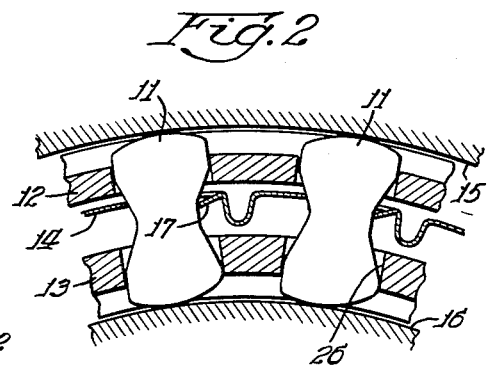
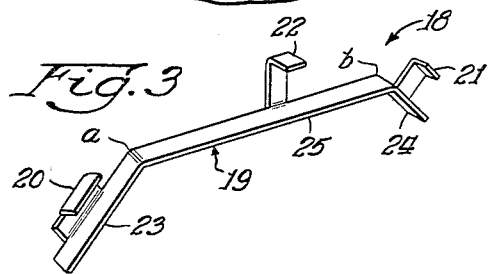
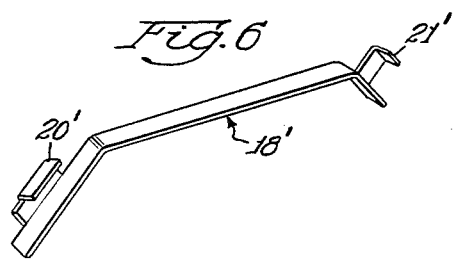
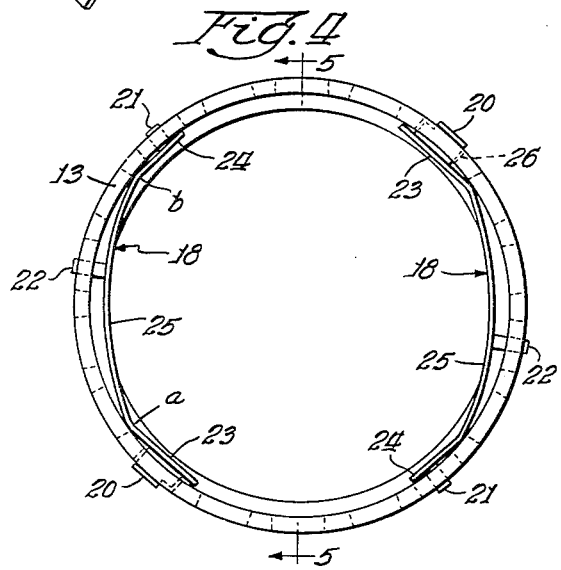
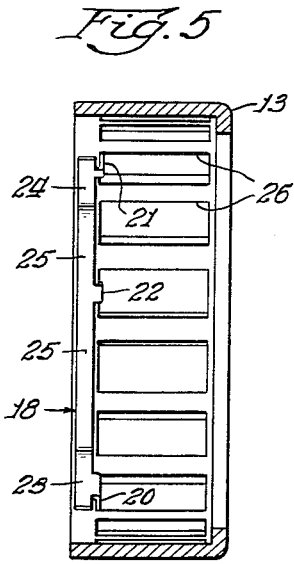
Inventor:
Carl R. Fagiano
By: Donald W. Banner  Atty.

United States Patent Office 2,940,568
Patented June 14, 1960

2,940,568
ONE-WAY CLUTCH AND DRAG SPRING

Carl R. Fagiano, Melrose Park, Ill., assignor to Borg-Warner Corporation, Chicago, Ill., a corporation of Illinois Filed Mar. 25, 1957, Ser. No. 648,279

3 Claims. (Cl. 192—45.1)

My invention relates to one-way engaging devices, and more particularly to one-way clutches of the tiltable sprag type, effective to transmit torque in one direction only, in combination with built-in frictional drag means.

One-way clutches of the over-running tiltable sprag type are well known and are commonly used in automatic transmissions for automotive vehicles. A one-way clutch of this general type is disclosed in pending application No. 379,534 of Trondley et al., filed September 11, 1953, and entitled "One-Way Clutch," now Patent No. 2,824,636, granted February 25, 1958.

One-way clutches of the type disclosed in application No. 379,534, in general, comprise a plurality of sprags formed with eccentric cylindrical surfaces adapted to engage an inner and an outer cylindrical race surface, an inner and an outer cage for spacing and phasing the sprags, and spring bias means adapted to tilt the sprags into engagement with the race surfaces.

It has been found advantageous under certain operating conditions to include built-in frictional drag means in clutches of this type for the purpose of overcoming the effect of the spring bias means and thereby reduce frictional wear between the sprags and the race surfaces when the clutch is operating in an over-running condition. It is desirable that this frictional drag means also be effective to cooperate with the spring bias means for forcing the tiltable sprags into engagement with the race surfaces when the relative direction of rotation of the races is reversed, that is, into a nonoverrunning condition.

It is an object of the present invention to provide improved one-way clutches having frictional drag means adapted to relate a cage of a one-way clutch to one of the race surfaces.

It is a further object to provide one-way clutches having frictional drag means in the form of a chordal spring adapted to provide frictional engagement between a clutch cage and an adjacent race surface.

It is another object to provide devices in accordance with the preceding objects which include a chordal drag spring formed with lugs adapted to over-lap the edge of a cage.

It is still another object to provide frictional drag means in the form of a chordal spring having lugs adapted to over-lap the edge of the inner cage of said clutch and to pre-load said spring to facilitate assembly of the clutch and drag spring on an inner race surface.

It is still another object to provide frictional drag means of simplified construction adapted to be incorporated into one-way clutches of existing manufacture.

The invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

Figure 1 is a side view of a preferred construction of a one-way clutch embodying the principles of the present invention;

Figure 2 is an enlarged fragmentary sectional view of a portion of the one-way clutch shown in Figure 1;

Figure 3 is an enlarged view of a preferred construction of a drag spring embodying the principles of the invention;

Figure 4 is a side view of the drag spring attached to the inner cage of a one-way clutch;

Figure 5 is a view taken on line 5—5 of Figure 4; and

Figure 6 is an enlarged side view of a modified construction of a drag spring embodying the principles of the present invention.

Like characters of reference designate like parts in the several views.

Referring to the figures, there is illustrated a one-way clutch 10 embodying the principles of the present invention and comprising a plurality of tiltable sprags 11, an outer annular rigid cage 12, an inner annular rigid cage 13 and an annular resilient wrinkled spring ribbon 14, all disposed between an outer cylindrical race surface 15 and an inner cylindrical race surface 16. The spring ribbon 14 has a plurality of energizing tabs 17 respectively adapted to bias each of the sprags 11 into engagement with the race surfaces 15 and 16. Chordal drag springs 18 are attached to the inner cage 13 and are adapted to relate the inner cage 13 to the inner race surface 16.

Referring to Figure 3, the drag spring 18 is seen to comprise an angularly formed thin strip 19 and three generally U-shaped lugs 20, 21 and 22. The strip 19 is bent at $a$ and $b$ so as to divide the strip 19 into three linear segments 23, 24 and 25. The lugs 20, 21 and 22 are integral with the sections 23, 24 and 25, respectively. The lugs 20 and 21 are adapted to engage the inner cage 13, as shown in Figure 4, with the segments 23 and 24 in engagement with the under surface of the cage 13. The section 25 substantially forms a chord in the circle described by the inner cage 13. As shown in Figures 4 and 5, the lugs 20, 21 and 22 are attached to the cage 13 and extend through apertures 26 formed in the cage 13. The apertures 26 are adapted to receive the sprags 11 which extend radially through the cage 13. The lug 22, when attached to the cage 13, pre-loads the spring 18 and bends the section 25 into a somewhat curved configuration as shown in Figure 4. It is desirable to deform the spring 18 in this fashion to facilitate the assembly of the clutch 10 on the inner race surface 16. This feature is necessary in many automatic transmission assemblies in which it is not possible to use a tapered mandrel, or to use a long lead on the inner race. After the clutch is assembled on the inner race surface 16, the section 25 of the spring 18 is deformed into a curved configuration by the race surface 16 and lies upon the race surface 16 in general conformance with the curvature thereof throughout at least a portion of its length. The lug 22 is lifted off of the cage 13 under this condition so that it no longer has any effect on the loading of the spring 18. The spring 18 is thus fixedly attached to the cage 13, and the frictional force between the inner race surface 16 and the spring 18 serves to relate the cage 13 to the inner race surface 16. It is to be noted that in order for the frictional force between the spring 18 and the inner race surface 16 to be effective upon the sprags 11, it is also necessary to relate the outer cage 12 with the outer race surface 15. This latter frictional relation can be established by any suitable means such as by means of a flanged bar formed on the outer cage 12 and in sliding contact with the outer race surface 15. This manner of relating the outer cage to the outer race has been fully disclosed in the co-pending application of Daniel M. Wade, S.N. 555,104, filed December 23, 1955, entitled "One-Way Clutches," now Patent No. 2,832,450, granted April 28, 1958. The frictional drag thus established between the cage 13 and the race surface 16 and between the cage 12 and the race surface 15 tends to cause the cage 13 to tilt the sprags 11 into a disengaged condition against the action of the spring ribbon 14 when the clutch 10 is overrunning. The function of the spring ribbon 14 is to bias the sprags 11 into engagement with the race surfaces 15 and 16 so that the sprags 11 will wedge between the surfaces 15 and 16 immediately upon a reversal in the relative direction of rotation. The function of the drag spring is to overcome the biasing force of the spring 14 and thereby reduce the frictional wear between the sprags 11 and the race surfaces 15 and 16 when the clutch 10 is overrunning. The drag created by the spring 18 also acts through the cage 13 so as to assist in tilting the sprags 11 into an engaged condition when the relative direction of rotation of the inner race surface 16 is reversed.

In certain applications, the drag spring 18 can be used on the inner cage 13 without relating the outer cage 12 to the outer race surface 15. One particular application is the situation where the inner race is stationary and it is desirable to hold the one-way clutch 10 to the inner race surface 16 in order to avoid centrifugal effects on the sprags 11. In such situation, the drag spring 18 tends to hold the entire clutch 10 stationary while the outer race is overrunning at high speed.

Figure 6 shows a modified construction of a drag spring 18 which eliminates the center lug 22. This modified construction can be utilized in a one-way clutch 10 of the type described when the clutch 10 can be assembled on an inner race surface 16 by using a tapered mandrel to gradually deform the drag springs 18' so as to conform to the outer circumference of the inner race surface 16. This modified drag spring construction functions identically with the construction described in Figure 3, since the lug 22 serves no useful purpose after the spring 18 is assembled on a race surface 16.

It can be seen that one-way clutches of existing manufacture can be readily adapted to incorporate the principles of the present invention. The drag springs disclosed are commended by their utter simplicity of construction and operation. The drag springs 18 are preferably made from suitable bearing material so that the adverse effects of frictional wear between the springs 18 and the race surface 16 are minimized. The drag springs 18 incorporated into the clutch 10 have the advantage of reducing the frictional wear between the sprags 11 and the race surfaces 15 and 16, and thereby substantially prolong the useful life of the one-way clutch 10.

While I have described my invention in connection with certain specific embodiments thereof, it is to be understood that this is by way of illustration and not by way of limitation and the scope of my invention is defined solely by the appended claims which should be construed as broadly as the prior art will permit.

I claim:

1. In a one-way engaging device adapted for disposition between a pair of concentric races having cylindrical and radially spaced surfaces defining a generally annular opening therebetween, the combination comprising a plurality of tiltable grippers for wedgingly coupling the races during attempted relative rotation therebetween in one direction only, cylindrical retaining means for said grippers including opening defining means through which portions of said grippers extend; and frictional drag means of bearing material comprising first means forming spaced attachment lugs disposed within said opening defining means and engaging said opening defining means in said retaining means for substantially preventing circumferential movement of said drag means relative to said retaining means and further comprising second means between said attachment lugs including a flexible portion movable radially relative to said retaining means and spaced radially from said retaining means sufficiently to engage the race adjacent said retaining means when the engaging device is inserted between the races whereupon said flexible portion flexes to conform to the curvature of the adjacent race to produce a sliding frictional engagement therewith which is transmitted to said cylindrical retaining means through said attachment lugs.

2. The device defined in claim 1 in which said second means has a radius of curvature greater than that of said cylindrical retaining means, and in which said second means is positioned radially inwardly of said retaining means whereby said second means engages the inner race when the device is positioned between a pair of races.

3. The device defined in claim 2 in which said retaining means comprise a pair of radially spaced and relatively arcuately movable cages, and in which said frictional drag means is attached to the radially inner cage and engages the inner race.

References Cited in the file of this patent

UNITED STATES PATENTS

| | | |
|---|---|---|
| 2,389,961 | Dodge | Nov. 27, 1945 |
| 2,404,221 | Dodge | July 16, 1946 |
| 2,630,896 | Dodge | Mar. 10, 1953 |
| 2,753,027 | Troendly et al. | July 3, 1956 |
| 2,824,636 | Troendly | Feb. 25, 1958 |
| 2,832,450 | Wade | Apr. 29, 1958 |